United States Patent
Sedarat et al.

(10) Patent No.: US 11,552,776 B1
(45) Date of Patent: Jan. 10, 2023

(54) HYBRID PHYSICAL LAYER FOR ETHERNET AND AUTOMOTIVE SERDES ALLIANCE (ASA) COMMUNICATIONS

(71) Applicant: Ethernovia Inc., San Jose, CA (US)

(72) Inventors: Hossein Sedarat, San Jose, CA (US); Christopher Mash, Harpenden (GB); Darren S. Engelkemier, Menlo Park, CA (US); Ramin Shirani, Morgan Hill, CA (US); Roy T. Myers, Jr., Morgan City, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 17/445,443

(22) Filed: Aug. 19, 2021

Related U.S. Application Data

(60) Provisional application No. 63/067,491, filed on Aug. 19, 2020.

(51) Int. Cl.
*H04L 5/16* (2006.01)

(52) U.S. Cl.
CPC .................................... *H04L 5/16* (2013.01)

(58) Field of Classification Search
CPC ........................................................ H04L 5/16
See application file for complete search history.

(56) References Cited

U.S. PATENT DOCUMENTS

| | | | | |
|---|---|---|---|---|
| 6,904,110 B2* | 6/2005 | Trans | ...................... | H04L 25/14 375/350 |
| 2013/0051260 A1* | 2/2013 | Liu | ...................... | H04L 43/0805 370/252 |
| 2013/0100949 A1* | 4/2013 | Gruber | ................... | H04L 1/0071 370/350 |
| 2016/0261375 A1* | 9/2016 | Roethig | ................... | H04L 7/041 |

\* cited by examiner

*Primary Examiner* — Harry H Kim
(74) *Attorney, Agent, or Firm* — Schwegman Lundberg & Woessner, P.A.

(57) ABSTRACT

Disclosed are systems, methods, and non-transitory computer-readable media for a hybrid physical layer that supports data communications using both Ethernet and ASA. Ethernet and ASA are communication standards that are commonly used in automotive environments; however, are not interoperable. The hybrid physical layer supports data communications using both Ethernet and ASA. For example, the hybrid physical layer may be configured into either a first mode of operation to support data communications using Ethernet or a second mode of operation to support data communications using ASA. Devices utilizing the hybrid physical layer can therefore be used with other components that utilize either communication standard.

20 Claims, 7 Drawing Sheets

HYBRID PHYSICAL LAYER FOR ETHERNET AND AUTOMOTIVE SERDES ALLIANCE (ASA) COMMUNICATIONS

CROSS-REFERENCE TO RELATED APPLICATIONS

The present application claims the benefit of priority of U.S. Provisional Application No. 63/067,491, filed on Aug. 19, 2020, which is incorporated herein by reference in its entirety.

TECHNICAL FIELD

An embodiment of the present subject matter relates generally to point to a physical layer, and more specifically, to a hybrid physical layer that supports data communications using Ethernet and Automotive SerDes Alliance (ASA).

BACKGROUND

High-speed data communication systems over physical copper wire has found increasingly more applications in automotive environments. Currently, there are several organizations that define standard specifications for such communication systems. For example, IEEE Ethernet 802.3ch and Automotive Serdes Alliance (ASA) are standards that are commonly used in automotive environments to provide a means for interoperability of the compliant systems from various vendors. Systems that are built based on different standards, however, are not necessarily interoperable. As a result, the applications of systems and components using the different standards is limited. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for a hybrid physical layer that supports data communications using both Ethernet and ASA. Ethernet and ASA are communication standards that are commonly used in automotive environments; however, are not interoperable. Devices designed for use with one of these standards (e.g., Ethernet) cannot be used with devices/components designed for use with the other standard (e.g., ASA). As a result, the applications of systems and components using the different standards is limited.

To alleviate this issue, a hybrid physical layer supports data communications using both Ethernet and ASA. For example, the hybrid physical layer may be configured into either a first mode of operation to support data communications using Ethernet or a second mode of operation to support data communications using ASA. Devices utilizing the hybrid physical layer can therefore be used with other components that utilize either communication standard.

Figure 1:
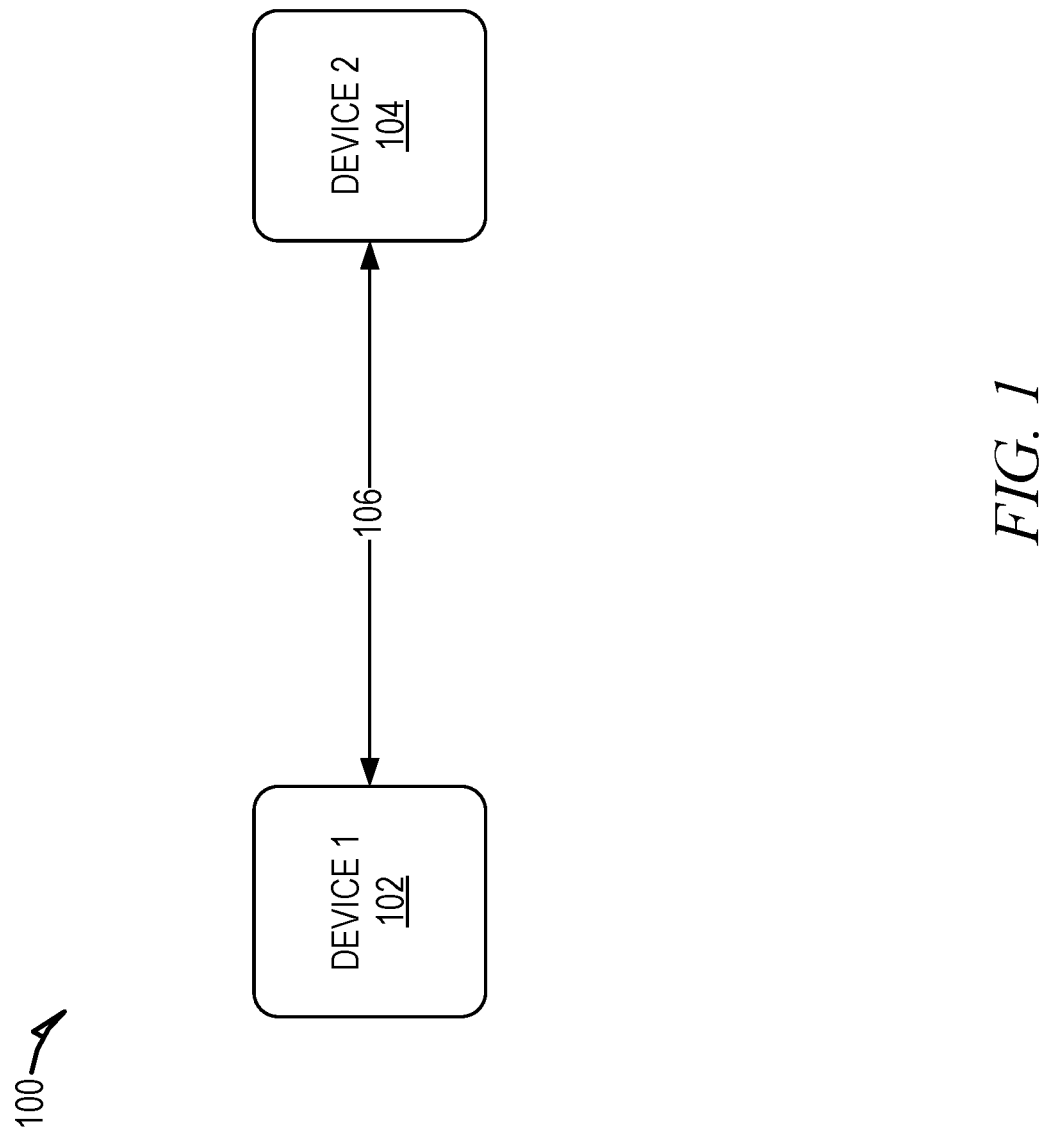
FIG. 1 is a block diagram of a point-to-point communication system, according to some example embodiments.

FIG. 1 is a block diagram of a point-to-point communication system 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the point-to-point communication system 100 to facilitate additional functionality that is not specifically described herein.

As shown, the point-to-point communication system 100 is comprised of two devices 102, 104 that are interconnected via a communication link 106 for transporting data between the devices 102, 104. The communication link 106 may include a wired communication link, a wireless communication link, or a combination thereof. For example, the communication link 106 may be a twisted pair of copper wire or coaxial cable.

The devices 102, 104 may be any of a variety of types of electrical component that can transmit and/or receive data communications. For example, a device 102, 104 may be a sensor, computing device, input device, display, actuator, switch, speakers, other output device, and the like. The devices 102, 104 can include some or all of the features, components, and peripherals of the machine 600 shown in FIG. 6.

The point-to-point communication system 100 may be implemented in any of a variety of applications to provide for network communication between connected devices 102, 104. For example, the point-to-point communication system 100 may be implemented within a vehicle (e.g., automobile, truck, airplane, ship, etc.) to provide for various electronics features and functionality, including safety-critical features.

As discussed earlier, Ethernet and ASA are communication standards that are commonly used in a variety of application, such as automotive environments, but are not interoperable. To allow for interoperability between devices 102, 104 using either ASA or Ethernet, one or both of the devices 102, 104 is equipped with a hybrid physical layer component that supports data communications using both Ethernet and ASA. The hybrid physical layer component may be configured into either a first mode of operation to support data communications using Ethernet or a second mode of operation to support data communications using ASA. A device 102, 104 equipped with the hybrid physical layer component can therefore communicate with another device 102, 104 that is equipped with either Ethernet or ASA.

In some embodiments, the hybrid physical layer component can be preconfigured to operate in either a first mode of operation to support data communications using Ethernet or a second mode of operation to support data communications using ASA. For example, the hybrid physical layer component may be preconfigured manually using a physical switch and/or programmatically by setting a bit or set of bits to specified values.

A user and/or manufacturer may therefore preconfigure the hybrid physical layer component based on the intended implementation, such as the communication protocol (e.g., Ethernet or ASA) that is being used by the external device 102, 104 to which the hybrid physical layer component will be communicating. For example, a vehicle manufacturer may preconfigure the hybrid physical layer component included in a first device 102 (e.g., processor) based on the communication protocol (e.g., Ethernet or ASA) that is being used in the second device 104 (e.g., camera, sensor) that is connected to the first device 102.

In some embodiments, the hybrid physical layer component self-configures based on its current implementation. For example, the hybrid physical layer component can analyze data communications received from an external device 102, 104 during the startup and training sequence to determine the communication protocol (e.g., Ethernet or ASA) being used by the external device 102, 104 from which the data communication was received. The hybrid physical layer component may then self-configure into the appropriate operating mode to supports the communication protocol (e.g., Ethernet or ASA) being used by the external device 102, 104.

The hybrid physical layer component supports data communications using either Ethernet or ASA by modifying operations of and/or enabling/disabling the various components of the hybrid physical layer component. Ethernet and ASA have several operational differences. For example, Ethernet employs a full duplex system in which both devices 102, 104 can communicate with each other simultaneously via the communication link 106, whereas ASA utilizes a half-duplex system in which communications between the connected devices 102, 104 is limited to one direction at a time via the communication link 106. As another example, Ethernet and ASA format data communications differently, such by using different framing structures, bit-packing format, headers, preambles, and the like. As another example, Ethernet and ASA use different startup and training sequences.

Supporting Ethernet involves use of some components that are not needed to support ASA. For example, echo-cancellation is used when providing full-duplex communications but is not needed to provide half-duplex communication. The hybrid physical layer component is therefore designed to include components to support Ethernet, which also allows the hybrid physical layer component to support ASA. The hybrid physical layer component modifies and/or enables/disables the various components to account for the operational difference between Ethernet or ASA. For example, to support full duplex communication used by Ethernet, the hybrid physical layer component may configure a transceiver component to remain continuously active and activate an echo cancelation filter. Alternatively, to support half-duplex communication used by ASA, the hybrid physical layer component may configure the transceiver component to shift between being activated and deactivated and deactivate the echo cancelation filter. Configuration of the hybrid physical layer to support data communications using either Ethernet or ASA is discussed in greater detail below.

Figure 2:
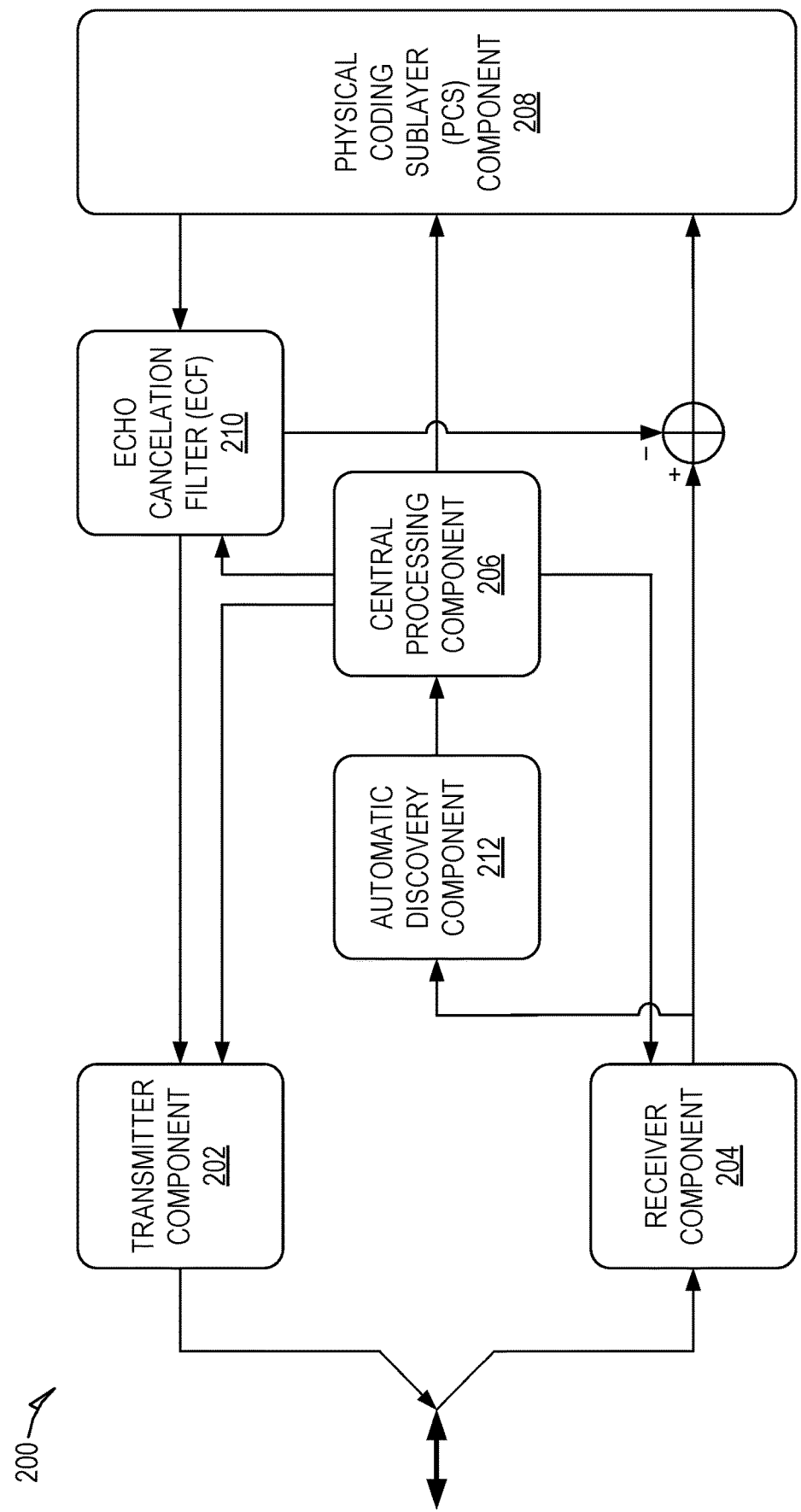
FIG. 2 is a block diagram of a hybrid physical layer component, according to some example embodiments.

FIG. 2 is a block diagram of a hybrid physical layer component 200, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 2. However, a skilled artisan will readily recognize that various additional functional components may be supported to facilitate additional functionality that is not specifically described herein. For example, the hybrid physical layer component 200 may be equipped with any components used to support data communications using Ethernet and ASA.

The hybrid physical layer component 200 is an electronic circuit that can be implemented as an integrated circuit to provide physical layer functions of the Open Systems Interconnection (OSI) model in a network interface controller. For example, the hybrid physical layer component 200 connects a link layer device to a physical medium, such as a copper cable, and provides analog signal physical access to the link layer device. As explained previously, the hybrid physical layer component 200 supports data communications using either Ethernet or ASA by modifying operations of and/or enabling/disabling the various components of the hybrid physical layer component 200.

As shown, the hybrid physical layer component 200 includes a transmitter component 202, a receiver component 204, a central processing component 206, a physical coding sublayer (PCS) component 208, an echo cancelation filter (ECF) 210, and an automatic discovery component 212.

The transmitter component 202 transmits data communications from the hybrid physical layer component 200 to an external device via a physical link. The transmitter component 202 may also convert data from one format into another. For example, the transmitter component 202 may include a digital to analog converter that is configured to convert digital data to an analog signal prior to transmission the external device via the physical link.

The receiver component 204, in contrast, receives data communications transmitted by the external device via the physical link. The receiver component 204 may also convert data from one format into another. For example, the receiver component 204 may include an analog to digital converter configured to convert analog signal received via the physical link to digital data.

The PCS component 208 handles bit processing for the hybrid physical layer component 200. For example, the PCS component 208 is responsible for data encoding and decoding, scrambling and descrambling, alignment marker insertion and removal, block and symbol redistribution, lane block synchronization and deskew, and the like. The PCS component 208 is configured to process data according to either Ethernet or ASA. For example, the PCS component 208 is configured to format data communications to support either Ethernet or ASA, such by using different framing structures, bit-packing format, headers, preambles, and the like, as well as format differently to support the startup and training sequences for both Ethernet and ASA.

The ECF 210 provides for signal echo cancellation when the hybrid physical layer component 200 is operating to support data communications using either Ethernet. Ethernet employs full-duplex communications in which both devices 102, 104 can communicate with each other simultaneously via the communication link 106. When providing simultaneous communications, the ECF 210 is used to cancel data that is being transmitted by the transmitter component 202 from data received by the receiver component 204 to avoid an echo. Echo cancellation is not needed when using half-duplex communications, as used by ASA.

The central processing component 206 provides functionality to configure the hybrid physical layer component 200 into either a first mode of operation to support data communications using Ethernet or a second mode of operation to support data communications using ASA. As explained earlier, Ethernet and ASA have several operational differences, such as employing a full duplex system versus a half-duplex system, using different data communication formats, using different startup and training sequences, and the like.

To configure the hybrid physical layer component 200 to support Ethernet or ASA, the central processing component 206 communicates with the other components of the hybrid physical layer component 200 to cause the various components to modify operations to support Ethernet or ASA. For example, to configure the hybrid physical layer component 200 to support Ethernet, the central processing component 206 signals the transmitter component 202 and the receiver component 204 to operate in a continuously activated state to support full-duplex communications. In the continuously activated state, the transmitter component 202 and the receiver component 204 remain activated (e.g., do not become deactivated) to facilitate continuous transmission and receiving of full-duplex data communications. The central processing component 206 may also cause the ECF 210 to become activated to provide for echo cancellation that is used during full-duplex data communications.

The central processing component 206 also communicates with the PCS component 208 to cause the PCS component 208 to operate according to Ethernet. This causes the PCS component 208 to perform the appropriate startup and training sequences for Ethernet as well as format data using the appropriate framing structures, bit-packing format, headers, preambles, and the like, for Ethernet. The central processing component 206 may also communicate with other components of the hybrid physical layer component 200 that are not shown in FIG. 2 to cause the components to operate according to Ethernet. For example, the processing component 206 may cause a hybrid digital to analog converter to become enabled to provide for echo cancellation. As another example, the processing component 206 may communicate with components that provide for equalization to cause the components to operate according to Ethernet.

To configure the hybrid physical layer component 200 to support ASA, the central processing component 206 utilizes the low-power idle (LPI) mode defined by the Energy-Efficient Ethernet (EEE) enhancement to IEEE. LPI mode is designed to reduce power consumption during periods of low data activity by placing various components into a sleep mode (e.g., deactivated) when data is not being sent. For example, a command is provided to initiate LPI mode is provided to various components, such as the transmitter component 202, to cause the components to remain deactivated for a specified period of time. The components may be activated periodically to transmit refresh signals to maintain link signaling integrity.

The hybrid physical layer component 200 utilizes the functionality of the LPI mode to support half-duplex data communications according to ASA. For example, a variant of LPI mode is configured to deactivate and activate the various components of the hybrid physical layer component 200, such as the transmitter component 202 and the receiver component 204, according to the message timing sequence defined by ASA. That is, the transmitter component 202 may be deactivated and the receiver component 204 may be activated while the hybrid physical layer component 200 is receiving data communications, and the transmitter component 202 may be activated and the receiver component 204 may be deactivated while the hybrid physical layer component 200 is transmitting data communications. While the machinery used to support EEE to turn on/off various blocks periodically in LPI mode can be used to implement half-duplex time-division multiplexing (TDM), this machinery should be designed to support various configuration parameters for LPI in Ethernet and TDM in ASA. For instance, the period to turn on/off various blocks in LPI for Ethernet is not the same as that in TDM for ASA. Therefore, the PHY design should have the support for this expanded range of parameters.

To configure the hybrid physical layer component 200 to support ASA, the central processing component 206 communicates with the various components, such as the transmitter component 202, the receiver component 204 and the PCS component 208 to cause the components to initiate the LPI mode. The hybrid physical layer component 200 also cause the PCS component 208 to operate according to ASA, such as by performing the appropriate startup and training sequences for ASA as well as formatting data using the appropriate framing structures, bit-packing format, headers, preambles, and the like, for ASA. The PCS component 208 is configured to transmit data during the Refresh signal period provided for by LPI mode. For example, the PCS component 208 generates preamble and data bits that are to be transmitted during Refresh period of LPI which is the active period of transmitter. Note that the duration of Refresh and Quiet period in TDM for ASA is different from those in LPI for Ethernet. The LPI machinery should support both sets of configuration parameters.

In some embodiments, the central processing component 206 may also deactivate components of the hybrid physical layer component 200 that are not needed when supporting ASA to conserve power and/or resource usage. For example, the central processing component 206 may cause the ECF 210 and/or a hybrid digital to analog converter (e.g., not shown) to become deactivated as echo cancellation is not needed in half-duplex data communications.

In some embodiments, the hybrid physical layer component 200 can be preconfigured to operate in either a first mode of operation to support data communications using Ethernet or a second mode of operation to support data communications using ASA. For example, the hybrid physical layer component 200 may be preconfigured manually using a physical switch and/or programmatically by setting a bit or set of bits to specified values. The central processing component 206 receives a signal indicating the selected configuration, thereby causing the central processing component 206 to configure the hybrid physical layer component 200 to operate according to corresponding mode of operation.

In some embodiments, the hybrid physical layer component 200 self-configures based on its current implementation. For example, the hybrid physical layer component 200 may include an automatic discovery component 212 that analyzes data communications received from an external device 102, 104 during the startup and training sequence to determine the communication protocol (e.g., Ethernet or ASA) being used by the external device 102, 104 from which the data communication was received. For example, the automatic discovery component 212 analyzes the data communicates to detect whether the data communication includes a signature of either an Ethernet or ASA signal. The automatic discovery component 212 provides the central processing component 206 with a signal indicating whether the external device is using Ethernet or ASA, thereby causing the central processing component 206 to configure the hybrid physical layer component 200 to operate according to corresponding mode of operation.

In some embodiments, the central processing component 206 may be configured to modify the operating mode of the hybrid physical layer component 200 based on an operation that is being performed. Equipping both devices 102, 104 with a hybrid physical layer component 200 allows for communicates between the two devices 102, 104 to be performed using either Ethernet or ASA. This allows for the communication protocol between the two devices 102, 104 to be modified dynamically to best suit the current operations being performed. For example, ASA may be preferable in situations in which one device 102 (e.g., a sensor) is primarily transmitting data and the other device 104 is primarily receiving data because ASA provides a higher data transmission rate in one direction. In some situations, however, it may be preferable to increase the data transmission rate in the opposite direction, such as when a firmware update is to be provided to the sensor. In this type of situation, the communication protocol used by the devices 102, 104 may be changed to Ethernet to provide for higher data transmission rate to the sensor. After the upgrade is completed, the communication protocol may be changed back to ASA.

The central processing component 206 may be configured to cause a change to the operating mode of the hybrid physical layer component 200 based on the operation that is being performed. For example, the central processing component 206 may cause the hybrid physical layer component 200 to initiate the startup and training sequence using either ASA or Ethernet based on the operation to be performed, thereby causing the hybrid physical layer component 200 in the external device to configure operations for the selected communication protocol. Similarly, the central processing component 206 may restart the startup and training sequence using a different communication protocol upon a detected change to the operation being performed, such as transmission of the firmware update completing.

Figure 3:
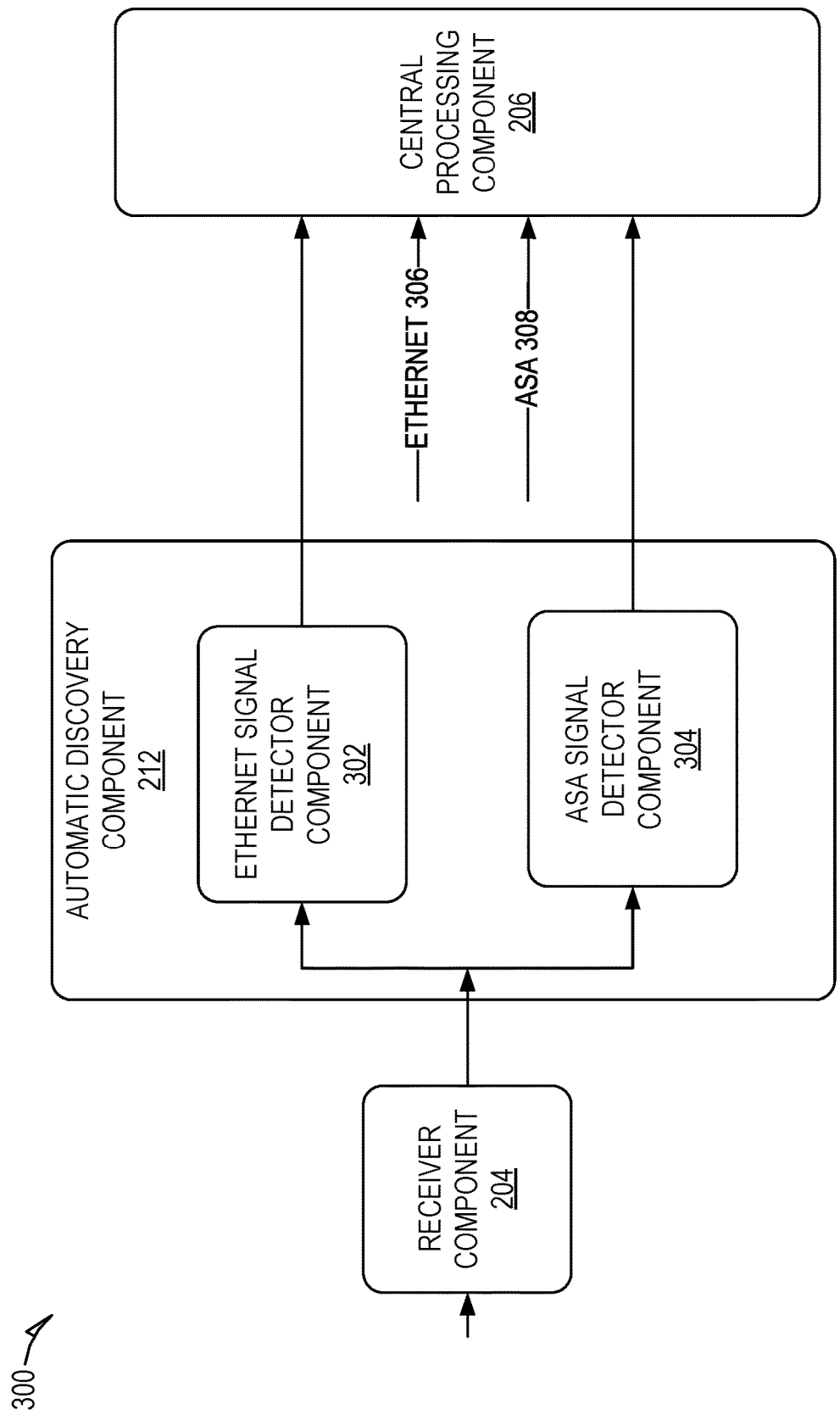
FIG. 3 is a block diagram of an automatic discovery component and the central processing component, according to some example embodiment.

FIG. 3 is a block diagram 300 of the automatic discovery component 212 and the central processing component 206, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 3. However, a skilled artisan will readily recognize that various additional functional components may be supported to facilitate additional functionality that is not specifically described herein.

As shown, the automatic discovery component 212 includes an Ethernet signal detector component 302 and an ASA signal detector component 304. Both the Ethernet signal detector component 302 and the ASA signal detector component 304 analyze data communications received by the receiver component 204 during the startup and training sequence to determine the communication protocol being used by an external device that transmitted the data. For example, the Ethernet signal detector component 302 analyzes the data communications to determine whether the data communications include a signature of an Ethernet signal. Likewise, the ASA signal detector component 304 analyzes the data communications to determine whether the data communications include a signature of an ASA signal. The Ethernet signal detector component 302 and the ASA signal detector component 304 both receive the data communications from the receiver component 204 and analyze the data communications simultaneously.

The Ethernet signal detector component 302 and the ASA signal detector component 304 both provide an output signal to the central processing component 206 indicating whether the received the data communications include a signature of an Ethernet signal or ASA signal, respectively. For example, the Ethernet signal detector component 302 may provide a signal value of 1 if the data communications include a signature of an Ethernet signal, and a signal value of 0 if the data communications do not include a signature of an Ethernet signal. Similarly, the ASA signal detector component 304 may provide a signal value of 1 if the data communications include a signature of an ASA signal, and a signal value of 0 if the data communications do not include a signature of an ASA signal. The central processing component 206 configures the hybrid physical layer component 200 to operate in either a first mode of operation to support data communications using Ethernet or a second mode of operation to support data communications using ASA based on the signals received from the Ethernet signal detector component 302 and the ASA signal detector component 304.

As shown, the central processing component 206 may also receive an Ethernet signal 306 and an ASA signal 308 to cause the hybrid physical layer component 200 to be configured to support either Ethernet or ASA. The signal values assigned to the Ethernet signal 306 and the ASA signal 308 may be based on preconfigured bit values or physical hardware switches.

The Ethernet signal 306 and the ASA signal 308 may be used to force the central processing component 206 into a particular mode of operations without consideration of the signals received from the Ethernet signal detector component 302 and the ASA signal detector component 304. That is, the Ethernet signal 306 and the ASA signal 308 may be used to preconfigure the hybrid physical layer component 200 into a specified operating mode. For example, a signal value of 1 received via the Ethernet signal 306 and a signal value of 0 received via the ASA signal 308 may cause the central processing component 206 to configure the hybrid physical layer component 200 to operate in the first mode of operation to support data communications using Ethernet. Alternatively, a signal value of 0 received via the Ethernet signal 306 and a signal value of 1 received via the ASA signal 308 may cause the central processing component 206 to configure the hybrid physical layer component 200 to operate in the second mode of operation to support data communications using ASA.

The Ethernet signal 306 and the ASA signal 308 may also be used to set the hybrid physical layer component 200 to self-configure based on the detected communication protocol used by an external device. For example, the signal value of the Ethernet signal 306 and the ASA signal 308 can be set to a matching value (e.g., both 0 or both 1) to cause the central processing component 206 to determine the operating mode based on the signals received from the Ethernet signal detector component 302 and the ASA signal detector component 304.

Figure 4A:
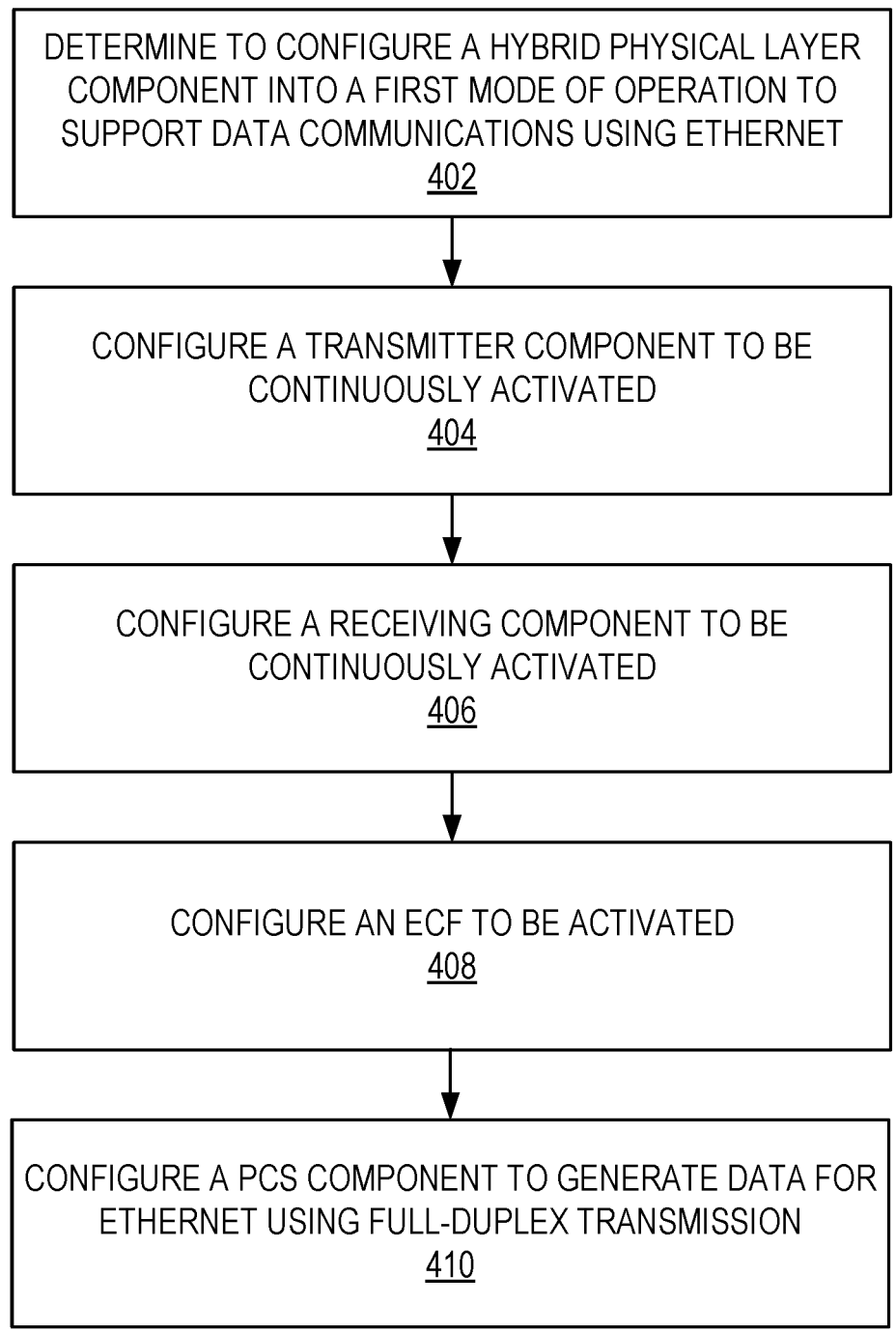
FIGS. 4A and 4B are flowcharts showing methods for configuring a hybrid physical layer component to supports data communications using both Ethernet and ASA, according to some example embodiments.
Figure 4B:
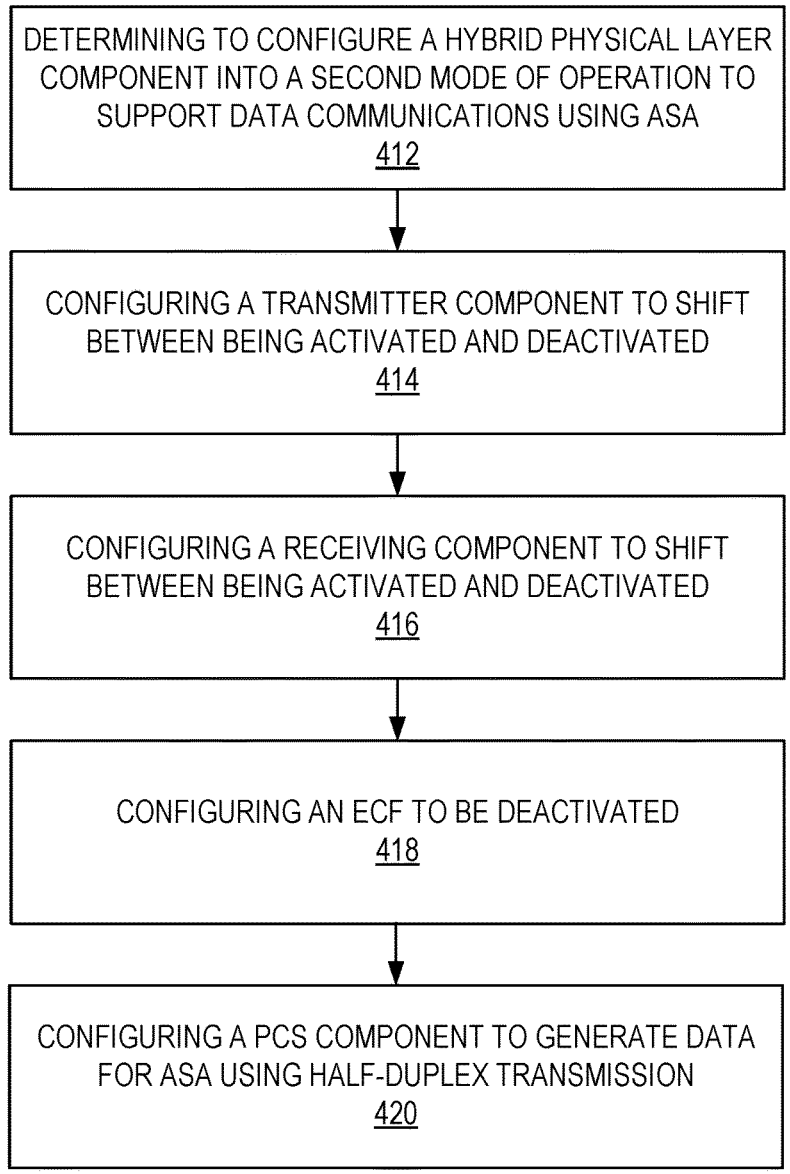

FIGS. 4A and 4B are flowcharts showing methods for configuring a hybrid physical layer component to supports data communications using both Ethernet and ASA, according to some example embodiments. The methods may be embodied in computer readable instructions for execution by one or more processors such that the operations of the methods may be performed in part or in whole by the hybrid physical layer component 200; accordingly, the methods are described below by way of example with reference to the hybrid physical layer component 200. However, it shall be appreciated that at least some of the operations may be deployed on various other hardware and/or software configurations and the methods are not intended to be limited to the hybrid physical layer component 200.

FIG. 4A is a flowchart showing a method 400 for configuring the hybrid physical layer component into the first mode of operation to support data communications using Ethernet.

At operation 402, the central processing component 206 determines to configure a hybrid physical layer component 200 into a first mode of operation to support data communications using Ethernet. The central processing component 206 may determine to configure the hybrid physical layer component 200 into the first mode of operation based on a preconfigured signal received via an Ethernet signal 306 and/or an ASA signal 308. Alternatively, the central processing component 206 may determine to configure the hybrid physical layer component 200 into the first mode of operation based on a signal received from an automatic discovery component 212. The automatic discovery component 212 analyzes data communications received from an external device 102, 104 during the startup and training sequence to determine the communication protocol (e.g., Ethernet or ASA) being used by the external device 102, 104. The automatic discovery component 212 provides the central processing component 206 with a signal indicating whether the external device is using Ethernet or ASA.

At operation 404, the central processing component 206 configures a transmitter component 202 to be continuously activated and at operation 406, the central processing component 206 configures a receiving a component 204 to be continuously activated. The central processing component 206 communicates with the other components of the hybrid physical layer component 200 to cause the various components to modify operations to support Ethernet. For example, to configure the hybrid physical layer component 200 to support Ethernet, the central processing component 206 signals the transmitter component 202 and the receiver component 204 to operate in a continuously activated state to support full-duplex communications. In the continuously activated state, the transmitter component 202 and the receiver component 204 remain activated (e.g., do not become deactivated) to facilitate continuous transmission and receiving of full-duplex data communications.

At operation 408, the central processing component 206 configures an ECF 210 to be activated. The central processing component 206 may also cause the ECF 210 to become activated to provide for echo cancellation that is used during full-duplex data communications. The central processing component may also activate other components, such as analog hybrid DAC, which may be essential for full-duplex operation.

At operation 410, the central processing component 206 configures a PCS component 208 to generate data for Ethernet using full-duplex transmission. The central processing component 206 also communicates with the PCS component 208 to cause the PCS component 208 to operate according to Ethernet. This causes the PCS component 208 to perform the appropriate startup and training sequences for Ethernet as well as format data using the appropriate framing structures, bit-packing format, headers, preambles, proper scrambling/descrambling, Reed-Solomon encoding/decoding, interleaving/de-interleaving and the like, for Ethernet. The central processing component 206 may also communicate with other components of the hybrid physical layer component to cause the components to operate according to Ethernet. For example, the processing component 206 may cause a hybrid digital to analog converter to become enabled to provide for echo cancellation. As another example, the processing component 206 may communicate with components that provide for equalization to cause the components to operate according to Ethernet.

FIG. 4B is a flowchart showing a method 450 for configuring the hybrid physical layer component into the second mode of operation to support data communications using ASA.

At operation 412, the central processing component 206 determines to configure a hybrid physical layer component 200 into a second mode of operation to support data communications using ASA. The central processing component 206 may determine to configure the hybrid physical layer component 200 into the second mode of operation based on a preconfigured signal received via an Ethernet signal 306 and/or an ASA signal 308. Alternatively, the central processing component 206 may determine to configure the hybrid physical layer component 200 into the second mode of operation based on a signal received from an automatic discovery component 212. The automatic discovery component 212 analyzes data communications received from an external device 102, 104 during the startup and training sequence to determine the communication protocol (e.g., Ethernet or ASA) being used by the external device 102, 104. The automatic discovery component 212 provides the central processing component 206 with a signal indicating whether the external device is using Ethernet or ASA.

At operation 414, the central processing component 206 configures a transmitter component 202 to shift between being activated and deactivated, and at operation 416, the central processing component 206 configures a receiving a component 204 to shift between being activated and deactivated. To configure the hybrid physical layer component 200 to support ASA, the central processing component 206 utilizes the LPI mode defined by the EEE enhancement to IEEE. LPI mode is designed to reduce power consumption during periods of low data activity by placing various components into a sleep mode (e.g., deactivated) when data is not being sent. For example, a command is provided to initiate LPI mode is provided to various components, such as the transmitter component 202, to cause the components to remain deactivated for a specified period of time. The components may be activated periodically to transmit refresh signals to maintain link signaling integrity.

The hybrid physical layer component 200 utilizes the functionality of the LPI mode to support half-duplex data communications according to ASA. For example, the LPI mode is configured to deactivate and activate the various components of the hybrid physical layer component 200, such as the transmitter component 202 and the receiver component 204, according to the message timing sequence defined by ASA. That is, the transmitter component 202 may be deactivated and the receiver component 204 may be activated while the hybrid physical layer component 200 is receiving data communications, and the transmitter component 202 may be activated and the receiver component 204 may be deactivated while the hybrid physical layer component 200 is transmitting data communications.

At operation 418, the central processing component 206 configures an ECF 210 to be deactivated. In some embodiments, the central processing component 206 may also deactivate components of the hybrid physical layer component 200 that are not needed when supporting ASA to conserve power and/or resource usage. For example, the central processing component 206 may cause the ECF 210 and/or a hybrid digital to analog converter to become deactivated as echo cancellation is not needed in half-duplex data communications.

At operation 420, the central processing component 206 configures a PCS component 208 to generate data for ASA using half-duplex transmission. The hybrid physical layer component 200 also cause the PCS component 208 to operate according to ASA, such as by performing the appropriate startup and training sequences for ASA as well as formatting data using the appropriate framing structures, bit-packing format, headers, preambles, and the like, for ASA. The PCS component 208 is configured to generated data communications using the refresh signals provided for by LPI mode. For example, the PCS component 208 generates data communications that include the training data that is generally transmitted in the refresh signals along with any additional payload data to be transmitted to the external device.

While Ethernet has defined a twisted pair of wires as the communication medium, ASA allows the option of coaxial cable. A differential transceiver designed for twisted pair can be connected to a coaxial cable either through a common-mode decoupling component (e.g., such as a transformer), or directly by connecting one of the two differential signal pins to ground. In later case, the transceiver should be designed with some limits on even-order hormonic distortions and higher tolerance to common-mode.

Software Architecture

Figure 5:
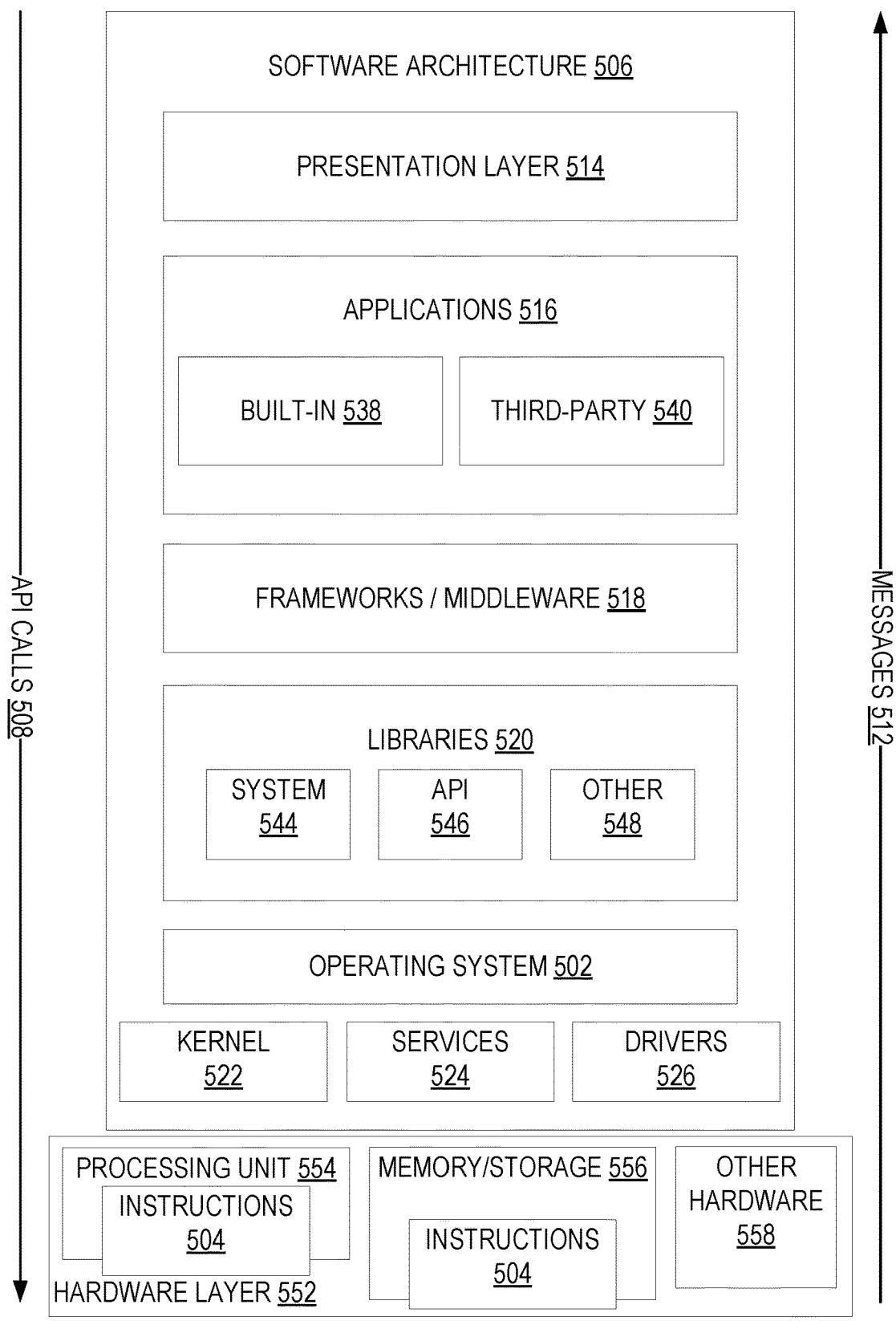
FIG. 5 is a block diagram illustrating an example software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture 506 and it will be appreciated that many other architectures may be implemented to facilitate the functionality described herein. The software architecture 506 may execute on hardware such as machine 600 of FIG. 6 that includes, among other things, processors 604, memory 614, and (input/output) I/O components 618. A representative hardware layer 552 is illustrated and can represent, for example, the machine 600 of FIG. 6. The representative hardware layer 552 includes a processing unit 554 having associated executable instructions 504. Executable instructions 504 represent the executable instructions of the software architecture 506, including implementation of the methods, components, and so forth described herein. The hardware layer 552 also includes memory and/or storage modules 556, which also have executable instructions 504. The hardware layer 552 may also comprise other hardware 558.

In the example architecture of FIG. 5, the software architecture 506 may be conceptualized as a stack of layers where each layer provides particular functionality, such as the Open Systems Interconnection model (OSI model). For example, the software architecture 506 may include layers such as an operating system 502, libraries 520, frameworks/middleware 518, applications 516, and a presentation layer 514. Operationally, the applications 516 and/or other components within the layers may invoke application programming interface (API) calls 508 through the software stack and receive a response such as messages 512 in response to the API calls 508. The layers illustrated are representative in nature and not all software architectures have all layers. For example, some mobile or special purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 520 provide a common infrastructure that is used by the applications 516 and/or other components and/or layers. The libraries 520 provide functionality that allows other software components to perform tasks in an easier fashion than to interface directly with the underlying operating system 502 functionality (e.g., kernel 522, services 524, and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 (also sometimes referred to as middleware) provide a higher-level common infrastructure that may be used by the applications 516 and/or other software components/modules. For example, the frameworks/middleware 518 may provide various graphical user interface (GUI) functions, high-level resource management, high-level location services, and so forth. The frameworks/middleware 518 may provide a broad spectrum of other APIs that may be used by the applications 516 and/or other software components/modules, some of which may be specific to a particular operating system 502 or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. Third-party applications 540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 540 may invoke the API calls 508 provided by the mobile operating system (such as operating system 502) to facilitate functionality described herein.

The applications 516 may use built in operating system functions (e.g., kernel 522, services 524, and/or drivers 526), libraries 520, and frameworks/middleware 518 to create UIs to interact with users of the system. Alternatively, or additionally, in some systems, interactions with a user may occur through a presentation layer, such as presentation layer 514. In these systems, the application/component "logic" can be separated from the aspects of the application/component that interact with a user.

Figure 6:
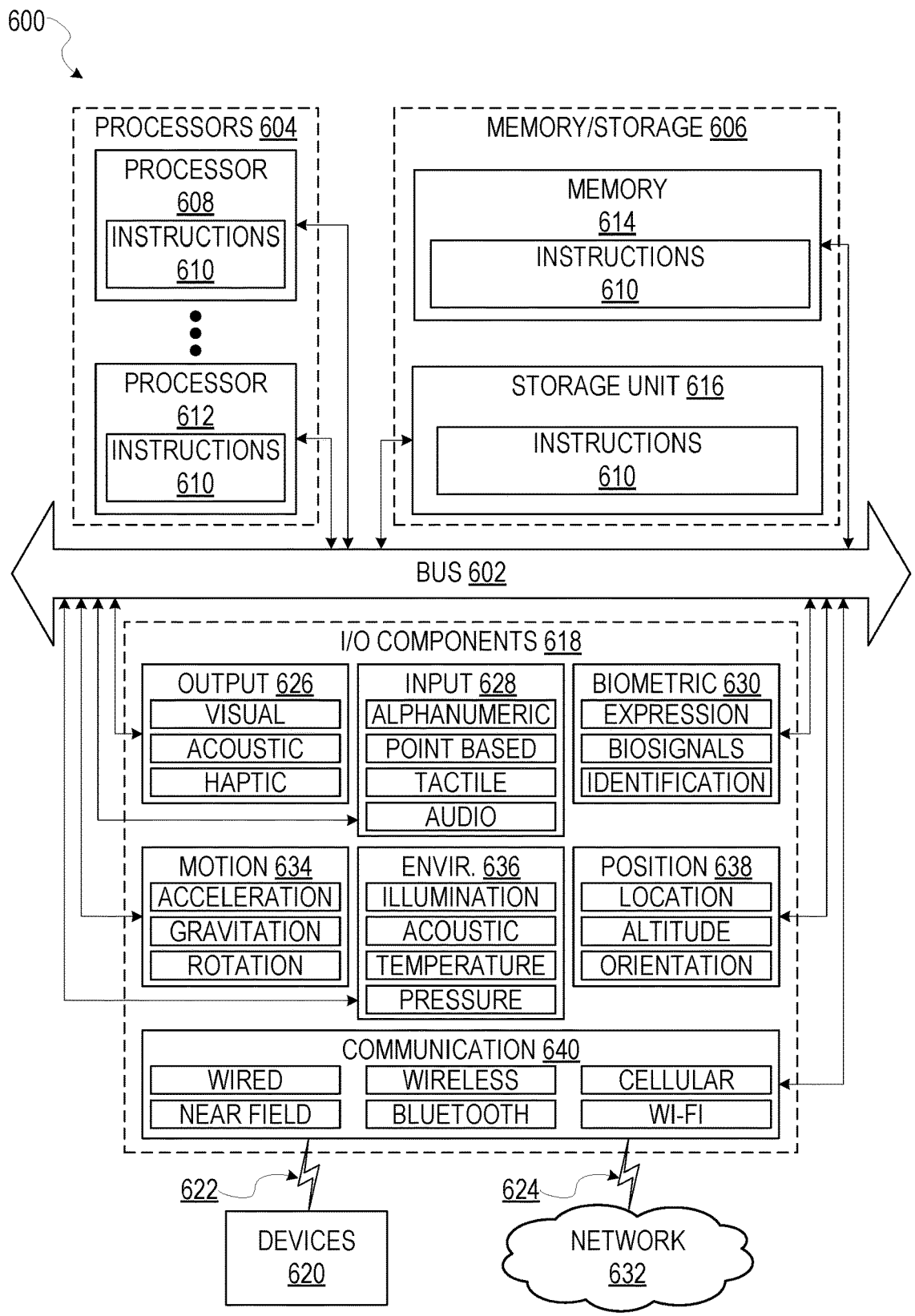
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 504 from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 600 capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 624 and coupling 622, respectively. For example, the communication components 640 may include a network interface component or other suitable device to interface with the network 632. In further examples, communication components 640 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 610 for execution by the machine 600, and includes digital or analog communications signals or other intangible medium to facilitate communication of such instructions 610. Instructions 610 may be transmitted or received over the network 632 using a transmission medium via a network interface device and using any one of a number of well-known transfer protocols.

"CLIENT DEVICE" in this context refers to any machine 600 that interfaces to a communications network 632 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 632.

"COMMUNICATIONS NETWORK" in this context refers to one or more portions of a network 632 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 632 or a portion of a network 632 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 610 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 610. The term "machine-readable medium" shall also be taken to include any medium, or combination of multiple media, that is capable of storing instructions 610 (e.g., code) for execution by a machine 600, such that the instructions 610, when executed by one or more processors 604 of the machine 600, cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 604) may be configured by software (e.g., an application 516 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 604 or other programmable processor 604. Once configured by such software, hardware components become specific machines 600 (or specific components of a machine 600) uniquely tailored to perform the configured functions and are no longer general-purpose processors 604. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 604 configured by software to become a special-purpose processor, the general-purpose processor 604 may be configured as respectively different special-purpose processors (e.g., comprising different hardware components) at different times. Software accordingly configures a particular processor or processors 604, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 602) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 604 that are temporarily configured (e.g., by software) or permanently configured to perform the relevant operations. Whether temporarily or permanently configured, such processors 604 may constitute processor-implemented components that operate to perform one or more operations or functions described herein. As used herein, "processor-implemented component" refers to a hardware component implemented using one or more processors 604. Similarly, the methods described herein may be at least partially processor-implemented, with a particular processor or processors 604 being an example of hardware. For example, at least some of the operations of a method may be performed by one or more processors 604 or processor-implemented components. Moreover, the one or more processors 604 may also operate to support performance of the relevant operations in a "cloud computing" environment or as a "software as a service" (SaaS). For example, at least some of the operations may be performed by a group of computers (as examples of machines 600 including processors 604), with these operations being accessible via a network 632 (e.g., the Internet) and via one or more appropriate interfaces (e.g., an API). The performance of certain of the operations may be distributed among the processors 604, not only residing within a single machine 600, but deployed across a number of machines 600. In some example embodiments, the processors 604 or processor-implemented components may be located in a single geographic location (e.g., within a home environment, an office environment, or a server farm). In other example embodiments, the processors 604 or processor-implemented components may be distributed across a number of geographic locations.

"PROCESSOR" in this context refers to any circuit or virtual circuit (a physical circuit emulated by logic executing on an actual processor 604) that manipulates data values according to control signals (e.g., "commands," "op codes," "machine code," etc.) and which produces corresponding output signals that are applied to operate a machine 600. A processor 604 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 604 may further be a multi-core processor having two or more independent processors 604 (sometimes referred to as "cores") that may execute instructions 610 contemporaneously.

What is claimed is:

1. A hybrid physical layer component implemented within a first device, the hybrid physical layer component supporting data communications using both Ethernet and Automotive SerDes Alliance (ASA), the hybrid physical layer component comprising:
   a transmitter component for transmitting data to an external device via a physical link;
   a physical coding sublayer (PCS) component configured to generate data for transmission by the transmitter component; and
   a central processing block configured to cause the hybrid physical layer component to operate in either a first mode of operation to support data communications using Ethernet or a second mode of operation to support data communications using ASA,
   wherein in the first mode of operation the transmitter component is continuously activated and the PCS component generates data for full-duplex transmission, and
   in the second mode of operation the transmitter component and the PCS component operate in a modified Low Power Idle mode during which the transmitter component shifts between being activated and deactivated and the PCS component generates data for half-duplex transmission while the transmitter is activated.

2. The hybrid physical layer component of claim 1, further comprising:
   a receiver component for receiving data from the external device via the physical link, wherein in the first mode of operation the receiver component is continuously activated to receive full-duplex transmission, and in the second mode of operation the receiver component shifts between being activated to while the transmitter component is deactivated and deactivated while the transmitter component is activated.

3. The hybrid physical layer component of claim 1, further comprising:
an echo cancelation filter (ECF) for cancelling data transmissions being transmitted by the hybrid physical layer component from data transmission being received by the hybrid physical layer component, wherein in the first mode of operation the ECF is activated and in the second mode of operation the ECF is deactivated.

4. The hybrid physical layer component of claim 1, wherein the data generated by the PCS component for half-duplex transmission includes preamble data and payload data.

5. The hybrid physical layer component of claim 1, further comprising an automatic discovery component configured to:
determine, based on data communications received from the external device, whether the external device is using Ethernet or ASA, yielding a determination; and
transmit a signal to the central processing block indicating whether the external device is using Ethernet or ASA, the central processing block causing the hybrid physical layer component to operate in either the first mode of operation or the second mode of operation based on the signal.

6. The hybrid physical layer component of claim 5, wherein the automatic discovery component comprises:
an Ethernet signal signature detector configured to determine, based on data communications received from the external device, whether the external device is using Ethernet; and
an ASA signal signature detector configured to determine, based on data communications received from the external device, whether the external device is using ASA.

7. The hybrid physical layer component of claim 1, wherein the central processing block is further configured to:
cause the hybrid physical layer component to operate in the first mode of operation, during which data is transmitted from the first device to the external device to perform an upgrade; and
in response to determining the upgrade is completed, cause the hybrid physical layer component to operate in the second mode of operation.

8. The hybrid physical layer component of claim 1, wherein the physical link is a twisted pair of copper wire.

9. The hybrid physical layer component of claim 1, wherein the physical link is a coaxial cable.

10. The hybrid physical layer component of claim 1, wherein the central processing block configures the hybrid physical layer component into either the first mode of operation or the second mode of operation based on a preconfigured data bit value.

11. A method for configuring a hybrid physical layer component that supports data communications using both Ethernet and Automotive SerDes Alliance (ASA), the method comprising:
determining, by a central processing block of the hybrid physical layer component, whether to configure the hybrid physical layer component to support data communications using ASA, yielding a first determination;
configuring a transmitter component and a physical coding sublayer (PCS) component of the hybrid physical layer component into either a first mode of operation to support data communications using Ethernet or a second mode of operation to support data communications using ASA based on the first determination, the transmitter component being configured to transmit data to an external device via a physical link and the PCS component configured to generate data for transmission by the transmitter component,
wherein in the first mode of operation the transmitter component is continuously activated and the PCS component generates data for full-duplex transmission, and
in the second mode of operation the transmitter component and the PCS component operate in a modified low power idle mode during which the transmitter component shifts between being activated and deactivated and the PCS component generates data for half-duplex transmission while the transmitter is activated.

12. The method of claim 11, further comprising:
configuring a receiver component into either the first mode of operation or the second mode of operation based on the first determination, the receiver component configured to receive data from the external device via the physical link,
wherein in the first mode of operation the receiver component is continuously activated to receive full-duplex transmission, and in the second mode of operation the receiver component shifts between being activated to while the transmitter component is deactivated and deactivated while the transmitter component is activated.

13. The method of claim 11, further comprising:
configuring an echo cancelation filter (ECF) and/or a hybrid analog-to-digital convertor into either the first mode of operation or the second mode of operation based on the first determination, the ECF and/or the hybrid analog-to-digital convertor configured to cancel data transmissions being transmitted by the hybrid physical layer component from data transmission being received by the hybrid physical layer component, wherein in the first mode of operation the ECF and/or the hybrid analog-to-digital convertor are activated and in the second mode of operation the ECF and/or the hybrid analog-to-digital convertor are deactivated.

14. The method of claim 11, wherein the data generated by the PCS component for half-duplex transmission includes training data and payload data.

15. The method of claim 11, wherein determining whether to configure the hybrid physical layer component to support data communications using Ethernet or ASA comprises:
receiving, by the central processing block, data from an automatic discovery component of the hybrid physical layer component, the data indicating whether the external device is using Ethernet or ASA.

16. The method of claim 15, wherein the data includes a first signal received from an Ethernet signal signature detector configured to determine, based on data communications received from the external device, whether the external device is using Ethernet, and a second signal from an ASA signal signature detector configured to determine, based on data communications received from the external device, whether the external device is using ASA.

17. The method of claim 11, wherein configuring the transmitter component and the physical coding sublayer (PCS) component of the hybrid physical layer component into either the first mode of operation or the second mode of operation comprises:
configuring the physical coding sublayer (PCS) component of the hybrid physical layer component to operate in the first mode of operation, during which data is transmitted from the first device to the external device to perform an upgrade; and in response to determining the upgrade is completed, cause the physical coding sublayer (PCS) component of the hybrid physical layer component to operate in the second mode of operation.

18. The method of claim 11, wherein the physical link is a twisted pair of copper wire.

19. The method of claim 11, wherein the physical link is a coaxial cable and a differential transceiver is connected to the coaxial cable either through a common-mode decoupling component or directly by grounding a signal pin of the differential transceiver.

20. The method of claim 11, wherein determining whether to configure the hybrid physical layer component to support data communications using Ethernet or ASA comprises:

receiving a signal including a preconfigured data bit value, the preconfigured data bit value indicating whether to configure the hybrid physical layer component to support data communications using Ethernet or ASA.

\* \* \* \* \*